June 29, 1937.                F. MICHELSSEN                2,085,437
                              OPTICAL LENS SYSTEM
                              Filed April 8, 1936            2 Sheets-Sheet 1

Inventor:
Fritz Michelssen

June 29, 1937.  F. MICHELSSEN  2,085,437
OPTICAL LENS SYSTEM
Filed April 8, 1936  2 Sheets-Sheet 2

Inventor:
Fritz Michelssen
by his attorney

Patented June 29, 1937

2,085,437

UNITED STATES PATENT OFFICE 2,085,437

OPTICAL LENS SYSTEM

Fritz Michelssen, Berlin-Steglitz, Germany, assignor to Neufeldt & Kuhnke Gesellschaft mit Beschränkter Haftung, Kiel, Germany, a corporation of Germany Application April 8, 1936, Serial No. 73,246
In Germany December 24, 1934

13 Claims. (Cl. 88—57)

The subject matter of the invention refers to optical lens systems, in particular arrangements of lenses which have the purpose of collecting the radiation from a source of light—for instance emanating from a wire spiral in an evacuated vessel and disposed on the central axis of the system and in its vicinity—at a large angle, for instance between 30° and 60°, or greater and to convert the spreading rays into parallelism and to thereafter reconcentrate these rays on the image side at a concentration angle similar to the spreading angle on the object side, i. e. at a focal ratio of 1:1.

In view of the requirements concerning light sources used in communication systems it is necessary that such a short focus system be corrected for infra red for a range of wave length from about 1.2 to about 2.6 microns ($\mu$) and not only for spherical and similar aberrations, but in particular chromatic aberration should be avoided within this range up to about $2.6\mu$. In many cases it is advisable to extend the wave range for achromatic correction downwardly to about $0.7\mu$, because thereby the mounting of the system during the manufacture is considerably facilitated.

In accordance with the present invention such a corrected lens system may be produced by composing it of lenses of at least two kinds of different materials, of which one kind constitutes a siliceous glass and the other a halide crystal. In the group of siliceous glasses are particular suitable flint glasses, above all heavy flint glass, further crystalline and melted quartz. In the group of halide crystals may be mentioned particularly rock salt, sylvine (KCL), potassium bromide and calcium fluoride or fluorspar ($CaF_2$). If desired several different materials of each of the groups mentioned may be used in an assembled lens system.

My invention is illustrated in the accompanying drawings in which—

Fig. 3 shows a modulator of the type which might be placed into the image focus of the novel lens system for controlling light rays in the rhythm of speech impulses or the like.

Figure 1:
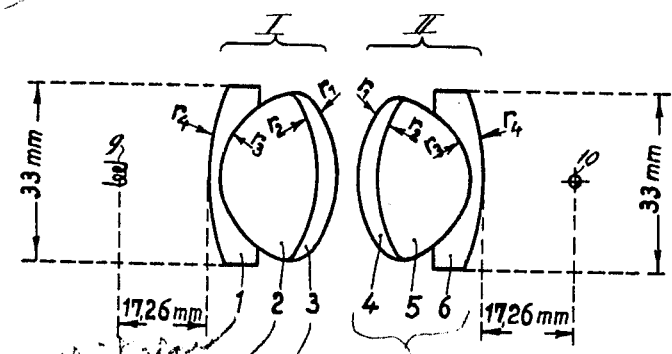
Fig. 1 shows the curvatures of one form of lens system in which my invention may be reduced to practice.

Referring to Fig. 1, with an arrangement there illustrated the effect is obtained that the infra red radiation emanating from the source of light 9 is collected by the cemented lens system section I at an angle up to about 60°, and projected as a beam of parallel rays toward a second, similar, but inverted section II of the lens system. Thus the cemented divisional system I has already a ratio of diameter to focal length of 1:1. Such a divsional system or unit as I consists of for instance a central rock salt lens 2, which is protected by two heavy flint glass lenses 1 and 3 against atmospheric influences, in particular water vapor. For a diameter of such a divisional lens system of 33 mm., cemented together with boric acid or Canada balsam permeable by infra red rays, the different curvature radii have the values $r_1 = 21.100$ mm.; $r_2 = 30.661$ mm.; $r_3 = 16.493$ mm. and $r_4 = 55.779$ mm. The other divisional lens system II, the purpose of which is to concentrate the parallel rays received from system I again at an angle of 60°, similar curvature ratios prevail as in the system I, and similarly in this case the two outer lenses 4 and 6 consist of heavy flint glass and the inner lens 5 of rock salt, cemented together as described with reference to divisional system I.

So far as I am aware, a lens system as aforedescribed and shown in Fig. 1 which is achromatic for a wave length from $0.8\mu$ to $2.5\mu$, and which has a ratio of opening or aperture to focal length of 1:0.5 and which has only one air space interposed between the divisional systems, has not been produced in the optical art, and so far as I know has not been held possible.

The present invention, however, extends an essential step further. By the character of the arrangement just described it becomes possible within the above-mentioned wave range to produce achromatic lenses which have a collecting angle greater than 60°, even up to 100°. Such a lens system, considered from the practical and economical standpoint, makes effective a light source of very small light energy and thus permits the use of relatively very small generators for producing the light—such as very small storage batteries, or the like. Collecting and concentration angles may be very materially increased beyond 60°—retaining however all advantages—by the insertion of an air gap into the system section I and/or II and by correspondingly changing the curvature radii of the component lens elements of the entire lens system. Such an arrangement is shown in principle in Fig. 1a. Each one of the sections I, II of the system contains its own air gap, so that considered from the left to the right in Fig. 1a the section or unit I contains a flint glass lens 1, a rock salt lens 2, air gap 7, rock salt lens 2, flint glass lens 3. The section II contains flint glass lens 3, rock salt lens 5, air gap 8, rock salt lens 5, flint glass lens 6. In such a case the entire system would contain three air gaps altogether.

According to the invention it is also possible according to the principle described with respect to Fig. 1 to produce a lens system corrected to a collecting angle of 100° and more at each end of a symmetrical system with only two air spaces interposed within the system. Such an arrangement is shown diagrammatically in Fig. 2. It comprises three units or sections I, II, III, separated by two air spaces, of which the two outer sections I and III are of similar construction, whereas the inner section II is of different construction. The intermediate lens element of each section of the system (4, 4 in each outer section I and III, and 5 in the middle section II) consists again of material of the aforementioned halide group, for instance rock salt, while in the outer sections I and III the lens elements 1, 2 and in the middle section II the lens elements 3, 3 consist again of material of the siliceous glass group, for instance heavy flint glass as mentioned above. In such a system at a maximum diameter of 70 mm. and at a distance of 17.3 mm. of the object and the image respectively from its appertaining system end, measured at the axis of the system, the curvature radii of the system are $r_1=100$ mm.; $r_2=73.6$ mm.; $r_3=39.3$ mm.; $r_4=29.0$ mm.; $r_5=85.4$ mm.; and $r_6=60.8$ mm. In this case the component lens elements indicated with 1, 2 and 3, consisting as mentioned of heavy flint glass, or its equivalents, and the intermediate lens element of rock salt or its equivalents in each section, are respectively cemented together as in Fig. 1. The entire system is protected from atmospheric effects by mounting it in an air-tight container, not shown here.

Figure 2:
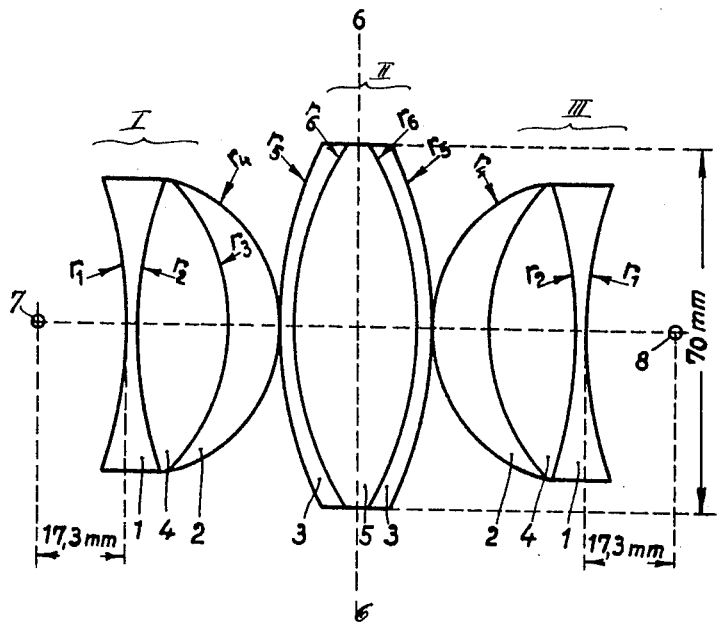
Fig. 2 shows a further modified lens system with two air gaps, convertible into a system with three air gaps.
Figure 1A:
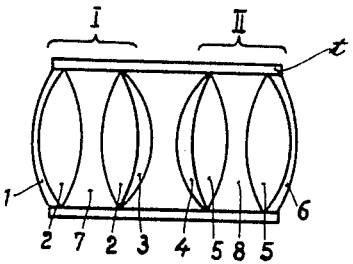
Fig. 1a shows a modification of Fig. 1.

One of the particular advantages of the system shown in Fig. 2 resides in the fact that its two outermost lens elements have their outside surfaces concave. Thereby the advantage over the convex outside surfaces, as shown in Figs. 1 and 1a, is attained that notwithstanding the very short focal lengths of the two outer sections I and III of the system the light rays enter and leave the system at a much larger angle of incidence to the outside lens surfaces than is possible with outside convex surfaces.

Due to the extremely short focal lengths of the entire system the two outer sections I and III may be made of a diameter which is smaller than the diameter of the middle section II, because the cone of rays centering in the points 7 and 8, even at an angle of about 100° would strike only a portion still removed quite a distance from the outer rim of lens element 1 if it had a diameter equal to that of the central section II of the lens system, and thus the marginal rim portion would become useless.

It should further be noted that a three-sectioned condenser lens system corrected for infra red and of the character described with respect to Fig. 2 may be separated at the transverse dash line 6, 6, and thus be divided into two separate systems each of which is capable by itself at a collecting angle of 100° to project the different received rays and waves as parallel rays, or to receive parallel directed rays and concentrate them on the axis of the system at a very short focal length. In such a separate system the two plane surfaces created at 6, 6 may be converted into curved surfaces of suitable curvature radii in which case the curvature radii $r_1$, $r_2$, $r_3$, $r_4$, $r_5$, and $r_6$ may be increased accordingly, and thus the manufacture of the constituent lens elements be facilitated.

Figure 3:
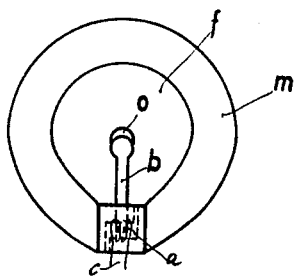
Figure 4:
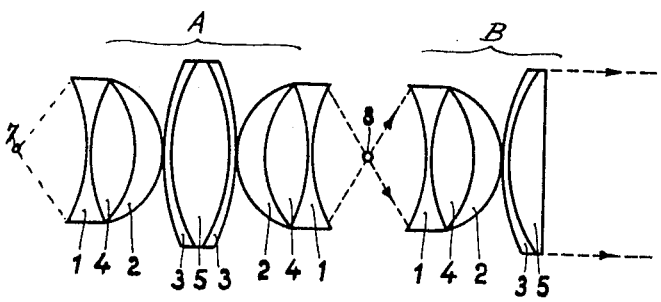
Fig. 4 shows the combination of a lens system according to Fig. 2 with a lens system for converting the light rays into parallel rays after they have been controlled by a modulator.

Such lens systems as described are used principally for concentrating the infra red portion of the radiation from a light source (for instance an incandescent lamp) most efficiently upon the modulating element of a transmitting system. For instance, if a three-sectional lens system such as is illustrated in Fig. 2 is used, the infra red radiation from the light source 7 is concentrated on the movable element of a communication system located at the point 8. Such an element may normally cast a shadow of the concentrated image light point 8 upon a light sensitive element of the transmitting system, which shadow may be modified and entirely removed by the motions of the element following the rhythms and the magnitude of the signal impulses received. As shown in Fig. 3, such a modulator may consist for instance of a horse shoe or annular-shaped magnet $m$, the inner space of which is covered by an opaque disc $f$ provided in its center with an aperture $o$. This aperture is partly covered by a stop $b$. Stop $b$ is connected with an iron armature $a$ which is movably mounted between the poles or pole shoes of magnet $m$. This armature carries, similar to the manner in which it is arranged in a loud speaker movement, a coil $c$ which is energized by the speaking currents and thus acts upon the normal magnet field, which prevails between the poles of magnet $m$ and which maintains the armature normally in a given position, by the varying field produced by the speaking currents. The armature is accordingly moved and thereby also moves stop $b$. The latter, therefore, controls the size of aperture $o$ in the rhythm of the speaking impulses. Aperture $o$ is located for instance in a system such as is shown in Fig. 2 at the focal point 8 where the light rays from the source 7 are concentrated and thus the light emanating through aperture $o$ is controlled in the rhythm of the speaking impulses. At the point 8 of image concentration controlled by the signal responsive element in the afore-described manner, a second lens system such as is represented by one-half of the system of Fig. 2, (i. e. up to the division line 6) may have its focal point, at which is then collected all the light energy obtainable at the point 8 according to the signal impulses and this spreading light energy may thus be converted into a beam of parallel rays which may be further utilized in the communication system. In Fig. 4 such an additional lens arrangement is shown. At the left hand end of this figure is disposed the lens system A similar to the entire lens system shown in Fig. 2, and which has its image focus at the point 8 at which the aperture of the modulator shown in Fig. 3 is located, and by which the light is controlled. To the right of the modulator, respectively to point 8 in Fig. 4, is located a second lens system B which corresponds with the left half of the system shown in Fig. 2 (up to the transverse line 6, 6) i. e. a system which is composed of a flint glass lens 1, a rock salt lens 4, a flint glass lens 2, an air gap, a flint glass lens 3, and one-half of the rock salt lens 5 in Fig. 2, i. e. a convex-plane lens. Thus the light energy emanating originally from a very small incandescent lamp 7 may be most efficiently utilized.

A division of the lens system shown in Fig. 2 into two parts at the line 6 is necessary in all cases where the modulation process used in the communication system requires parallel rays, for instance when it is desired to use a Kerr cell which would be connected to the first half of the system located to the left of line 6 and at the plane surface aforedescribed and from which parallel directed rays emanate.

Figure 5:
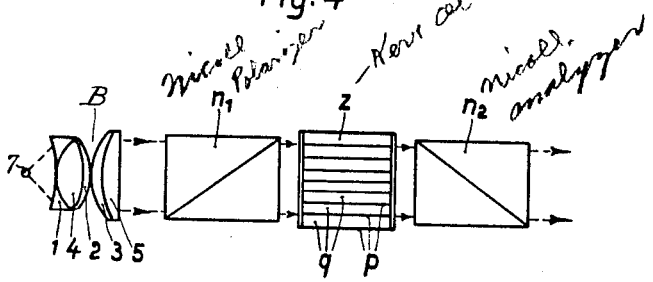
Fig. 5 shows a modification of a portion of the lens system according to Fig. 2 used in connection with a Kerr cell.

Such an arrangement is shown in Fig. 5. There the lens system B corresponds with the left hand portion of the system shown in Fig. 2 (up to the line 6, 6) i. e. it is composed of a flint glass lens 1, a rock salt lens 4, a flint glass lens 2, an air gap and flint lens glass 3 and one-half of the rock salt lens 5 in Fig. 2, i. e. a convex-plane lens. The parallel rays emanating in Fig. 5 from rock salt lens 5 traverse the polarizer $n_1$ of a Nicoll prism, then a Kerr cell $z$ which is composed of a number of superposed plate electrodes $p$ interposed with quartz plates $q$. The direction of the planes of these plates coincide with the directions of the light rays. The light rays emanating at the right hand end of the Kerr cell $z$ then pass through the analyzer $n_2$ of the Nicoll prism and then pass to the outside as a beam of parallel rays.

In all types of lens systems, such as are represented for instance in Figs. 1a, 4 and 5, and in which the rock salt lenses are located on the outside, it is necessary to protect these lenses by a quartz plate permeable to infra red rays. It is further necessary in such cases to also protect the inner lenses of the system peripherally against atmospheric influences, which may be accomplished for instance by enclosing the entire lens system in an air-tight tube, such as is indicated for instance in Fig. 1a at $t$.

I claim:

1. An optical lens system corrected for spherical and chromatic aberration for a range of wave lengths from $0.6\mu$ to $2.6\mu$, and consisting of at least one front lens unit composed of at least one bi-convex halide crystal lens element of suitable curvature peripherally protected against the outside atmosphere and confined air-tight in axial direction between two outer silicious glass lens elements of dispersive power when combined and of a curvature to permit a ratio of aperture to focal length of at least 1:2, at least one of said silicious lens elements having a surface complementary to and in contact with said halide lens element.

2. An optical lens system corrected for spherical and chromatic aberration for a range of wave lengths from $0.6\mu$ to $2.6\mu$, and consisting of at least one front lens unit composed of at least one bi-convex halide crystal lens element of suitable curvature peripherally protected against the outside atmosphere and confined air-tight in axial direction between two outer silicious glass lens elements of dispersive power when combined and of a curvature to permit a ratio of aperture to focal length of 1:0.5, at least one of said silicious lens elements having a surface complementary to and in contact with said halide lens element.

3. An optical lens system corrected for spherical and chromatic aberration for a range of wave lengths from $0.6\mu$ to $2.6\mu$, and consisting of at least one front lens unit composed of a bi-convex halide crystal lens element of suitable curvature peripherally protected against the outside atmosphere and cemented between two outer silicious glass lens elements of dispersive power when combined and of a curvature to permit a ratio of aperture to focal length of at least 1:2.

4. An optical lens system corrected for spherical and chromatic aberration for a range of wave lengths from $0.6\mu$ to $2.6\mu$, and consisting of at least one front lens unit composed of two bi-convex halide crystal glass lens elements of suitable curvature peripherally protected against the outside atmosphere and air-tight enclosed in axial direction together between two outer silicious glass lens elements of dispersive power when combined and of a curvature to permit a ratio of aperture to focal length of at least 1:2, said halide lens elements being spaced by an air gap and each being cemented to the directly adjacent silicious glass lens element.

5. An optical lens system corrected for spherical and chromatic aberration for a range of wave lengths from $0.6\mu$ to $2.6\mu$, and composed of a cemented lens unit comprising a convex-concave heavy flint glass lens having the curvature radii of 55.779 mm. and 16.493 mm. respectively, a bi-convex rock salt lens peripherally protected against the outside atmosphere and cemented to said flint glass lens and having the curvature radii of 16.493 mm. and 30.661 mm. and a concave-convex heavy flint glass lens cemented to said rock salt lens and having the curvature radii of 30.661 mm. and 21.100 mm. respectively and a second similarly constructed lens unit axially spaced from said first unit but disposed inverted with respect thereto.

6. An optical lens system corrected for spherical and chromatic aberration for a range of wave lengths from $0.6\mu$ to $2.6\mu$, and consisting of at least one front lens unit composed of at least one bi-convex halide crystal lens element of suitable curvature peripherally protected against the outside atmosphere and confined air-tight in axial direction between two outer flint glass lens elements of dispersive power when combined and of a curvature to permit a ratio of aperture to focal length of at least 1:2, at least one of said flint glass lens elements having a surface complementary to and in contact with said halide lens element.

7. An optical lens system corrected for spherical and chromatic aberration for a range of wave lengths from $0.6\mu$ to $2.6\mu$, and consisting of at least one front lens unit composed of at least one bi-convex halide crystal lens element of suitable curvature peripherally protected against the outside atmosphere and confined air-tight in axial direction between two outer heavy flint glass lens elements of dispersive power when combined and of a curvature to permit a ratio of aperture to focal length of at least 1:2, at least one of said flint glass lens elements having a surface complementary to and in contact with said halide lens element.

8. An optical lens system corrected for spherical and chromatic aberration for a range of wave lengths from $0.6\mu$ to $2.6\mu$, and consisting of at least one front lens unit composed of at least one bi-convex halide crystal glass lens element of suitable curvature peripherally protected against the outside atmosphere and confined air-tight in axial direction between two outer silicious lens elements composed of flint glass and quartz respectively and of dispersive power when combined and having a curvature to permit a ratio of aperture to focal length of at least 1:2, at least one of said silicious lens elements having a surface complementary to and in contact with said halide lens element.

9. An optical lens system corrected for spherical and chromatic aberration for a range of wave lengths from $0.6\mu$ to $2.6\mu$, and consisting of at least one front lens unit composed of at least one bi-convex rock salt crystal lens element of suitable curvature peripherally protected against the outside atmosphere and confined air-tight in axial direction between two outer silicious glass lens elements of dispersive power when combined and of a curvature to permit a ratio of aperture to focal length of at least 1:2, at least one of said flint glass lens elements having a surface complementary to and in contact with said rock salt lens element.

10. An optical lens system corrected for spherical and chromatic aberration for a range of wave lengths from $0.6\mu$ to $2.6\mu$, and consisting of a plurality of lens units, each unit composed of at least one bi-convex halide crystal lens element of suitable curvature peripherally protected against the outside atmosphere and confined air-tight in axial direction between two outer silicious glass lens elements of dispersive power when combined and of a curvature to permit a ratio of aperture to focal length of at least 1:2, the inner surface of at least one of said silicious lens elements having a surface complementary to and in contact with said halide lens element, the outer surfaces of the outer silicious glass lens elements of said lens system having concave outer surfaces.

11. An optical lens system corrected for spherical and chromatic aberration for a range of wave lengths from $0.6\mu$ to $2.6\mu$, and consisting of at least three lens units, each unit composed of at least one bi-convex halide crystal glass lens element of suitable curvature peripherally protected against the outside atmosphere and confined air-tight in axial direction between two outer silicious glass lens elements of dispersive power when combined and of a curvature to permit a ratio of aperture to focal length of at least 1:2, the inner surface of at least one of said silicious lens elements having a surface complementary to and in contact with said halide lens element, the outer surfaces of the outer silicious glass lens elements of said lens system having concave outer surfaces and the end units of said system having a smaller diameter than the intermediate unit portions of the system.

12. An optical lens system corrected for spherical and chromatic aberration for a range of wave lengths from $0.6\mu$ to $2.6\mu$ and composed of a cemented lens unit comprising a bi-concave heavy flint glass lens having the curvature radii of 100 mm. and 73.6 mm., a bi-convex rock salt lens having the curvature radii of 73.6 mm. and 39.3 mm., a concave-convex heavy flint glass lens having the curvature radii of 39.3 mm. and 29.0 mm., and a second cemented lens unit spaced from the first unit and comprising a convex-concave heavy flint glass lens having the curvature radii of 85.4 mm. and 60.8 mm. and a convex-plane rock salt lens having a convex curvature radius of 60.8 mm.

13. A symmetrical optical lens system composed of two lens systems each according to claim 12 integrated at their plane ends, for reconcentrating the rays, received from the object, at the image end of the system at a focal length substantially similar to that prevailing at the object end.

FRITZ MICHELSSEN.